(12) United States Patent
Jeong et al.

(10) Patent No.: US 8,355,593 B2
(45) Date of Patent: Jan. 15, 2013

(54) IMAGE RESTORING APPARATUS AND METHOD THEREOF

(75) Inventors: Young-Min Jeong, Suwon-si (KR);
Sung-Dae Cho, Yongin-si (KR);
Byung-Jun Son, Seoul (KR)

(73) Assignee: Samsung Electronics Co., Ltd (KR)

( * ) Notice: Subject to any disclaimer, the term of this patent is extended or adjusted under 35 U.S.C. 154(b) by 492 days.

(21) Appl. No.: 12/687,604

(22) Filed: Jan. 14, 2010

(65) Prior Publication Data

US 2010/0177978 A1 Jul. 15, 2010

(30) Foreign Application Priority Data

Jan. 14, 2009 (KR) ........................ 10-2009-0002908

(51) Int. Cl.
*G06K 9/40* (2006.01)

(52) U.S. Cl. ....... 382/254; 382/274; 382/275; 358/3.26; 358/3.27

(58) Field of Classification Search .................. 382/254, 382/260, 274, 275, 278; 358/3.26, 3.27, 358/463

See application file for complete search history.

(56) References Cited

U.S. PATENT DOCUMENTS

| | | | | |
|---|---|---|---|---|
| 5,734,915 A | * | 3/1998 | Roewer | 715/202 |
| 6,084,978 A | * | 7/2000 | Taylor et al. | 382/154 |
| 7,027,054 B1 | * | 4/2006 | Cheiky et al. | 345/473 |
| 7,308,139 B2 | * | 12/2007 | Wentland et al. | 382/181 |
| 2005/0168482 A1 | | 8/2005 | Criminisi et al. | |
| 2007/0160309 A1 | | 7/2007 | Bertozzi et al. | |
| 2008/0238942 A1 | | 10/2008 | Sun et al. | |

FOREIGN PATENT DOCUMENTS

JP 2008-300990 12/2008

OTHER PUBLICATIONS

Lin et al.: "Fast Image Completion", Visual Communications and Image Processing, Jul. 12, 2005.
Hongying et al.: "Image Completion Algorithm based on Texture Synthesis", Chinese Journal of Systems Engineering and Electronics, vol. 18, No. 2, Jan. 1, 2007.
Cheng et al.: "Robust Algorithm for Exemplar-based Image Inpainting", The Int. Conf. on Computer Graphics, Imaging and Vision, Jul. 26, 2005.
Li et al.: "An Image Inpainting Method", Computer Aided Design and Computer Graphics, Dec. 7, 2005.

* cited by examiner

*Primary Examiner* — Yosef Kassa
(74) *Attorney, Agent, or Firm* — The Farrell Law Firm, P.C.

(57) ABSTRACT

Disclosed is an image restoring apparatus and a method thereof, which sets a restoration image area to establish a portion of a target image area to be restored as a restoration image area to be restored with priority according to a request for an image restoration; sets a search area to establish an area with a predetermined size including the restoration image area as a search area; detects a similar image area to search for the most similar image area to the restoration image area within the search area; and reconstructs the deteriorated image in a natural manner by copying the image of the detected similar image area and attaching the same to the restoration image area.

16 Claims, 9 Drawing Sheets
(6 of 9 Drawing Sheet(s) Filed in Color)

IMAGE RESTORING APPARATUS AND METHOD THEREOF

PRIORITY

This application claims priority under 35 U.S.C. §119(a) to an application entitled "Image Restoring Apparatus And Method Thereof" filed in the Korean Industrial Property Office on Jan. 14, 2009 and assigned Serial No. 10-2009-0002908, the contents of which are hereby incorporated by reference.

BACKGROUND OF THE INVENTION

1. Field of the Invention

The present invention relates to an image restoring apparatus and a method thereof, and more particularly to an image restoring apparatus and a method thereof based on object removal by exemplar-based inpainting technology.

2. Description of the Related Art

In general, an image inpainting technology refers to a technology which originated from restoration of deteriorated or corrupted art works in museums in the past. Nowadays, inpainting may be used in various applications to reconstruct a corrupted part of a painting or a photograph, or to remove a portion thereof.

Image inpainting is a technology which interpolates pixels of a background image area near the boundary portion of a target image when the target image to be restored exists, and fills a target image area with the interpolated pixels. In this context, the background image stands for a remaining image except the target image to be restored in the original image.

However, the resulting image created by using such an image inpainting technology has drawbacks in that it generates a severe blur phenomenon.

A variety of technologies have been studied to supplement the image inpainting technology. One such technology is an object removal by exemplar-based inpainting technology.

The object removal by exemplar-based inpainting technology is a method to locate the most similar image to a background image adjacent to the boundary portion of a target image with reference to an edge and flat area in the original image, and fill the target image area with the searched image.

Figure 1A:
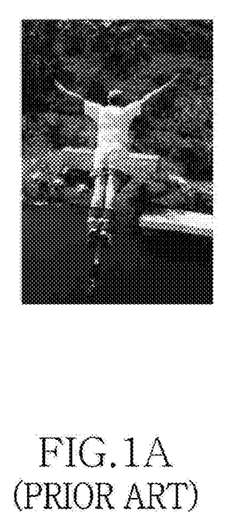
FIGS. 1A through 1C are drawings illustrating an image restoration technology in the prior art.
Figure 1B:
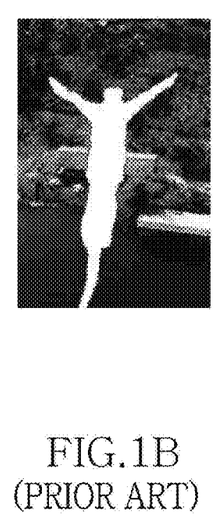
Figure 1C:
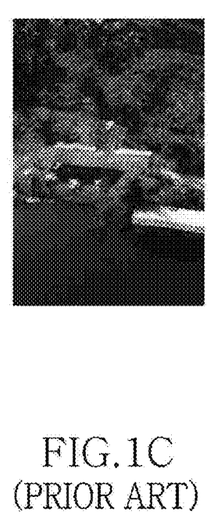

Referring to FIGS. 1A, 1B and 1C, an image restoring apparatus using the object removal by exemplar-based inpainting technology establishes the target image as shown in FIG. 1B from the original image as shown in FIG. 1A. Then, the image restoring apparatus establishes both the background image area adjacent to the boundary portion of the target image and a restoration image area including a boundary image area of the target image. The restoration image area refers to an area which includes a portion of the target image to be restored with a predetermined size.

The image restoring apparatus is adapted to search for a similar image area which has the most similar pixel value to that of the established restoration image area within the background image area. The pixel value of the restoration image area stands for the pixel value of the background image area within the restoration image area. The pixel value includes an average value of Red, Green Blue (RGB), a distribution degree of RGB, an edge value, or the like, of the pixels included in the image area.

The image restoring apparatus copies only a similar target image, which corresponds to the target image area within the restoration image area among the searched similar image areas, and attaches the same to the target image area of the restoration image area. The image restoring apparatus repeatedly performs the operations as the above until the image restoration operation is completed. When the image restoration operation is completed, the resulting image may be shown as in FIG. 1C.

As described above, the deteriorated or corrupted image is conventionally reconstructed by using the object removal by exemplar-based inpainting technology, but this technology has drawbacks in that a totally different image from the image to be restored in the target image area may be detected at the time of searching for the similar image area which has the most similar pixel value to that of the restoration image area.

Figure 2A:
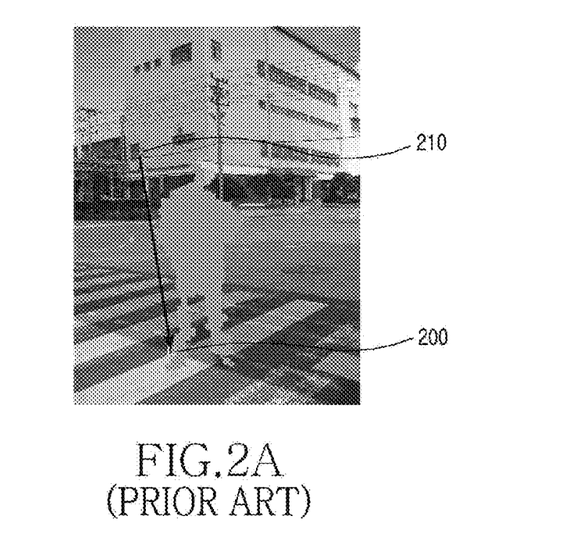
FIGS. 2A and 2B are drawings illustrating an image applied with the image restoration technology in the prior art.
Figure 2B:
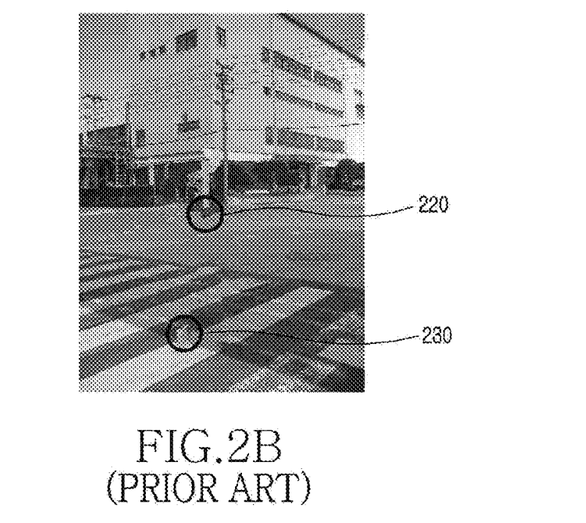

Referring to FIGS. 2A and 2B, the conventional image restoring apparatus searches for the similar image area 210 in FIG. 2A, which has the most similar pixel value to that of the background image within the restoration image area 200, in the background image. However, since the similar image area 210 is located away from the restoration image area 200 in FIG. 2A, the similar image area to be searched can be a completely different image from that of the image to be restored. Therefore, there have been drawbacks in that the restored final image may have errors as indicated by numerals 220 and 230 in FIG. 2B.

SUMMARY OF THE INVENTION

Accordingly, the present invention has been made to solve at least the above-mentioned problems occurring in the prior art, and the present invention provides an image restoring apparatus and a method thereof which can reduce the errors as described above and restore an image.

In accordance with an aspect of the present invention, there is provided an image restoring apparatus that includes a restoration image area setting part for establishing a portion of a target image area to be restored as a restoration image area to be restored with priority according to a request for an image restoration; a search area setting part for establishing an area with a predetermined size including the restoration image area as a search area; a similar image area detecting part for detecting the most similar image area to the restoration image area in the search area; and a reconstructing part for copying the image of the detected similar image area and attaching the same to the restoration image area.

In accordance with another aspect of the present invention, there is provided an image restoring method that includes setting a restoration image to establish a portion of a target image area to be restored as a restoration image area to be restored with priority according to a request for an image restoration; setting a search area to establish an area with a predetermined size including the restoration image area as the search area; detecting a similar image area to search for the most similar image area to the restoration image area in the search area; and reconstructing an image to copy the image of the detected similar image area and attach the same to the restoration image area.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the present invention will be more apparent from the following detailed description taken in conjunction with the accompanying drawings, in which.

DETAILED DESCRIPTION OF THE INVENTION

Hereinafter, embodiments of the present invention will be described with reference to the accompanying drawings. In the following description, a detailed description of known functions and configurations incorporated herein will be omitted when it may make the subject matter of the present invention rather unclear.

Constructions of an image restoring apparatus and operations thereof in accordance with an embodiment of the present invention will be described in detail with reference to FIG. 3.

Figure 3:
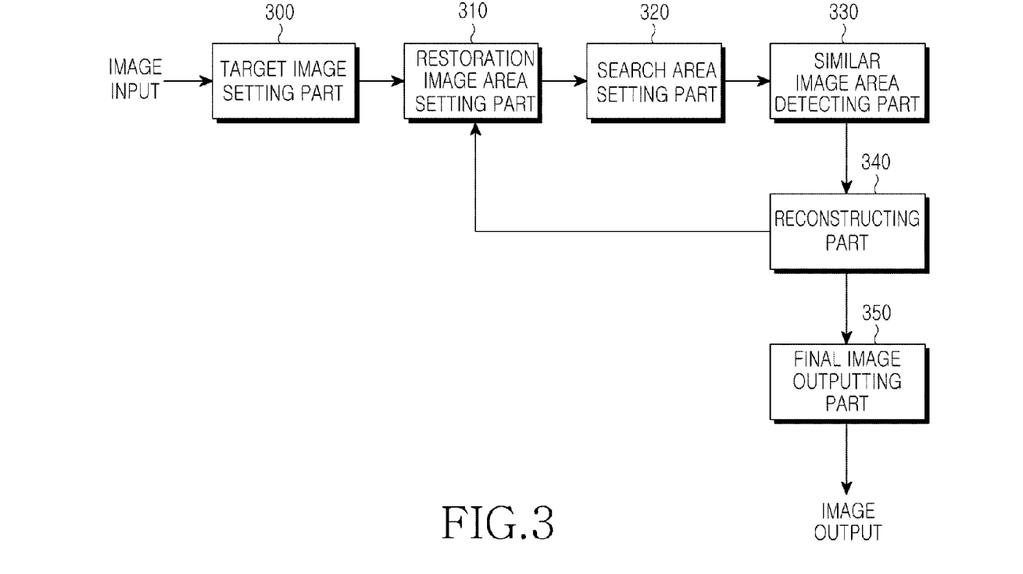
FIG. 3 is a diagram illustrating construction of an image restoring apparatus in accordance with an embodiment of the present invention.

FIG. 3 is a block diagram illustrating a construction of the image restoring apparatus in accordance with an embodiment of the present invention.

The image restoring apparatus includes a target image setting part 300, a restoration image area setting part 310, a search area setting part 320, a similar image area detecting part 330, a reconstructing part 340, and a final image outputting part 350.

The target image setting part 300 is designed to establish a target image area in an original image which is input by the request for establishing the target image.

The restoration image area setting part 310 establishes an area, which has the largest edge value within an adjacent background image which is a background image area adjacent to the boundary area of a target image, as a restoration image area. The reason for this is to determine an area which should be restored first among the target image areas to be restored.

Further, the restoration image area setting part 310 calculates both the pixel number of the background image area within the restoration image area and the pixel number of the target image area. If the calculated pixel number of the background image area is less than that of the target image area, the restoration image area setting part 310 changes the position or size of the restoration image area to increase the pixel number of the background image area.

In other words, the restoration image area setting part 310 calculates an edge direction of the background image area within the restoration image area. Then, the restoration image area setting part 310 moves the position of the restoration image area or makes the size of the restoration image area larger than that of the original one with reference to the calculated edge direction so that the pixel number of the background image area may be greater than that of the target image area. Consequently, the present invention can detect a much more exact similar image because the more the pixel number included in the background image area is increased, the more the objects to be compared with the original image are created.

If the pixel number of the background image area is greater than that of the target image area, the restoration image area setting part 310 immediately transfers the image having the established restoration image area to the search area setting part 320, or makes the size of the restoration image area greater than that of the original one depending on a user option.

The search area setting part 320 establishes a search area to be used for searching for the similar image having the pixel value which is the most similar to that of the restoration image area. When the search area setting part 320 establishes the search area, the search area setting part 320 calculates the edge direction of the restoration image area, and adjusts the transverse or longitudinal length of the search area with reference to the calculated edge direction. For instance, when the edge direction is a transverse one, the search area setting part 320 may establish a rectangular-shaped search area having a longer transverse length. On the other hand, when the edge direction is a longitudinal one, the search area setting part 320 may establish a rectangular-shaped search area having a longer longitudinal length. Further, if there is no edge direction, the search area setting part 320 may establish a square-shaped search area.

The similar image area detecting part 330 detects a similar image area having the pixel value which is the most similar to that of the restoration image area within the established search area. In other words, the similar image area detecting part 330 calculates the pixel value for every area corresponding to the size of the restoration image area within the searched area, and selects an area, which has the smallest deviation from the pixel value of the restoration image area among the calculated pixel values, as a similar image area.

The reconstructing part 340 copies only the similar target image which corresponds to the target image area within the detected similar image area, attaches the same to the target image area of the restoration image area, and then confirms whether the image restoration operation is completed.

Upon completion of the image restoration, the reconstructing part 340 transmits the restored image to the final image outputting part 350. If the image restoration is not completed, the reconstructing part 340 brings back the reconstructed image to the image area setting part 310, which allows the image restoration operation to continue until the target image area is completely filled with the similar target image.

The final image outputting part 350 displays the completely restored final image on a screen.

It can be appreciated that the present invention can detect the similar image area which is the most similar to the restoration image area by changing the size and position of the restoration image area with reference to the edge direction of the restoration image area, and restore the deteriorated image in a natural manner.

Hereinafter, processes of the image restoration with the image restoring apparatus constructed as shown in FIG. 3 in accordance with a preferred embodiment of the present invention will be described in detail with reference to FIGS. 4A and 4B.

Figure 4A:
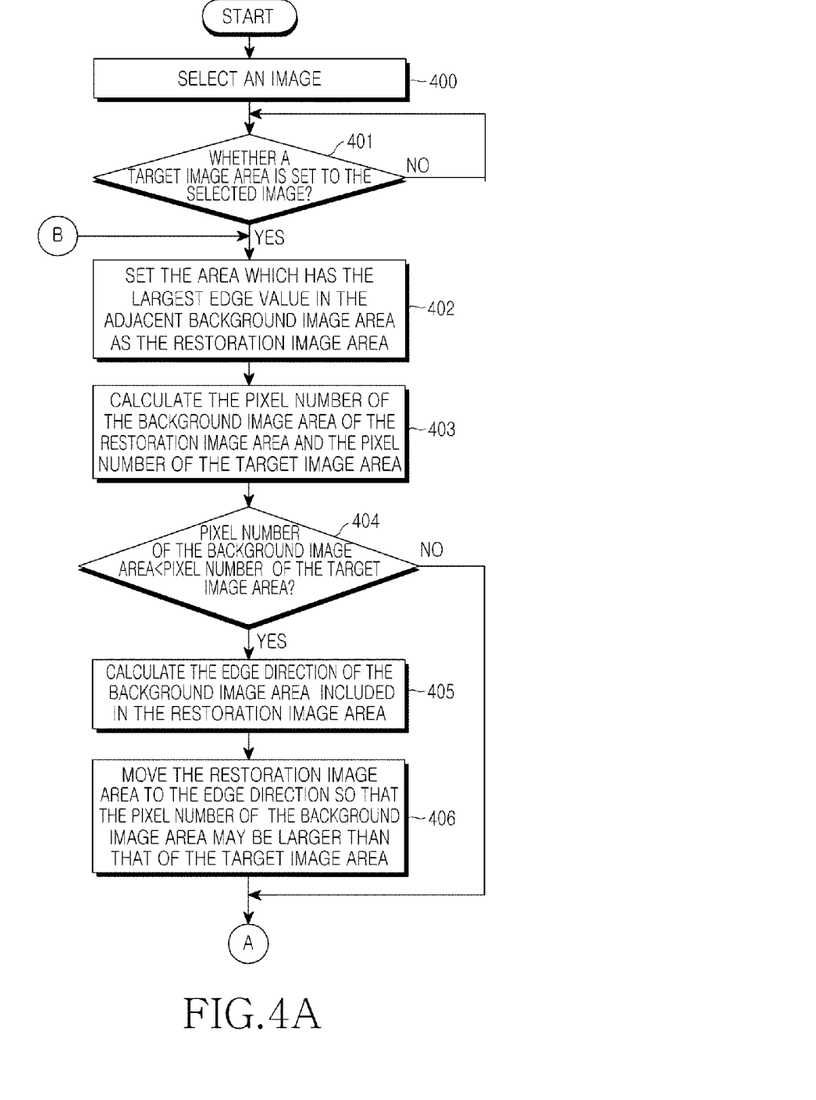
FIG. 4A is a flow chart illustrating processes for establishing a restoration image area of the image being selected using an image restoring apparatus in accordance with an embodiment of the present invention.

FIG. 4A is a flow chart illustrating processes for establishing a restoration image area of the image being selected using an image restoring apparatus in accordance with an embodiment of the present invention.

When an image is selected in step 400, the target image setting part 300 checks whether the target image area is established in the selected image in step 401. If the target image area is established, the target image setting part 300 transmits the selected image to the restoration image area setting part 310 and proceeds to step 402. In contrast, the target image setting part 300 continues to check whether the target image area is established in step 401.

Figure 5A:
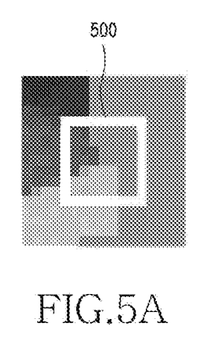
FIGS. 5A through 5E are drawings illustrating the processes for establishing the restoration image area using an image dividing device in accordance with an embodiment of the present invention.

In step 402, the restoration image area setting part 310 establishes an area, which has the largest edge value in the adjacent background image area, as the restoration image area. In other words, the restoration image area setting part 310 calculates the average edge value for the pixels included in every area having a constant size within the adjacent background image area, and selects an area, which has the largest average edge value among the average edge values calculated as above, as the restoration image area. The restoration image area as such may be indicated by numeral 500 in FIG. 5A.

Then, in step 403, the restoration image area setting part 310 calculates both the pixel number of the background image area included in the established restoration image area and the pixel number of the target image area.

In step 404, the restoration image area setting part 310 compares the calculated pixel number of the background image area with that of the target image area. If the pixel number of the background image area is less than that of the target image area, the process moves onto step 405; otherwise, it goes to step 407.

Figure 6:
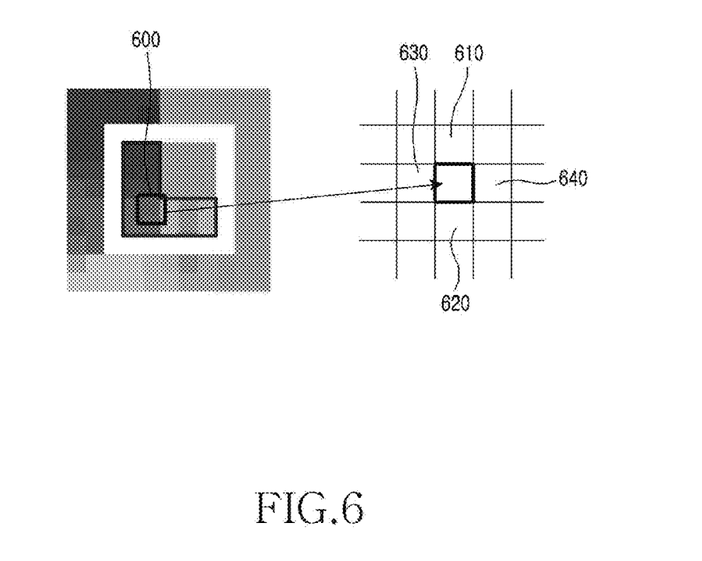
FIG. 6 is a diagram illustrating the processes for calculating an edge direction of the restoration image area using the image dividing device in accordance with an embodiment of the present invention.

In step 405, the restoration image area setting part 310 calculates the edge direction of the background image area within the restoration image area. Referring to FIG. 6, the restoration image area setting part 310 calculates the differential value of RGB for the pixels 610 and 620 around an arbitrary pixel 600 included in the background image area within the restoration image area, and further calculates the differential value of RGB for the pixels 630 and 640. Thus, the restoration image area setting part 310 confirms a pixel which has the greatest differential value of RGB amongst the calculated differential values of RGB. For example, if the differential value of RGB for the pixels 610 and 620 is greater than that of the pixels 630 and 640, the restoration image area setting part 310 recognizes the edge direction of the arbitrary pixel 600 as a transverse direction to transversely penetrate the pixels 610 and 620.

In order to calculate the edge direction of the background image area as the above, the restoration image area setting part 310 employs an algorithm as shown in Table 1.

TABLE 1

```
for q ∈ Patch(p)
    if ( q == SOURCE ) then
        ( grad_x, grad_y ) = Get_Gradient(q)
        total_grad_x += grad_x
        total_grad_y += grad_y
    end if
end for
```

Here, grad_x and grad_y are calculated through an algorithm as shown in Table 2.

TABLE 2 grad_x = | ( Gray(610) − Gray( 620 ) ) / 2 |
grad_y = | ( Gray(630) − Gray( 640 ) ) / 2 |, wherein Gray(610)-Gray(620) is the differential value of RGB for the pixels 610 and 620 in FIG. 6, while Gray(630)-Gray(640) is the differential value of RGB for the pixels 630 and 640.

Figure 5B:
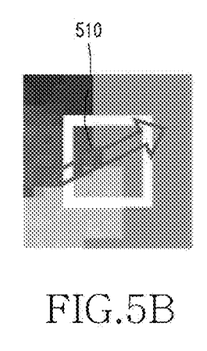
Figure 5C:
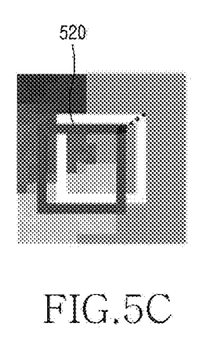

In step 406, the restoration image area setting part 310 moves the restoration image area with reference to the edge direction so that the pixel number of the background image area may be larger than that of the target image area. In other words, if the calculated edge direction has the same edge direction as indicated by arrow 510 in FIG. 5B, the restoration image area setting part 310 moves the restoration image area 500 to a position 520, so that the pixel number of the background image area may be greater than that of the target image area.

Then, after the restoration image area setting part 310 goes through steps 404 and 406 to step 407, it confirms whether there is a request for changing the size of the established restoration image area. If there is such a request, the restoration image area setting part 310 proceeds to step 408, otherwise goes to step Ⓐ.

Figure 5D:
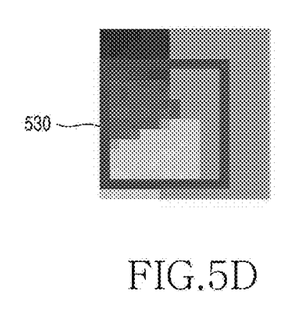

In step 408, the restoration image area setting part 310 changes the size of the restoration image area by making it greater than the original. Such a restoration image area whose size has been changed may be shown by a reference numeral 530 in FIG. 5D.

As described above, the restoration image area setting part 310 moves the restoration image area or makes the size of the restoration image area greater so that the pixel number of the background image area may be greater than that of the target image area, which makes it possible for the similar image area detecting part 330 to more correctly detect the image area similar to the restoration image area.

In step 408, operations for restoring the image after establishing the search area in FIG. 4A will be described in detail with reference to FIG. 4B hereinbelow.

Figure 4B:
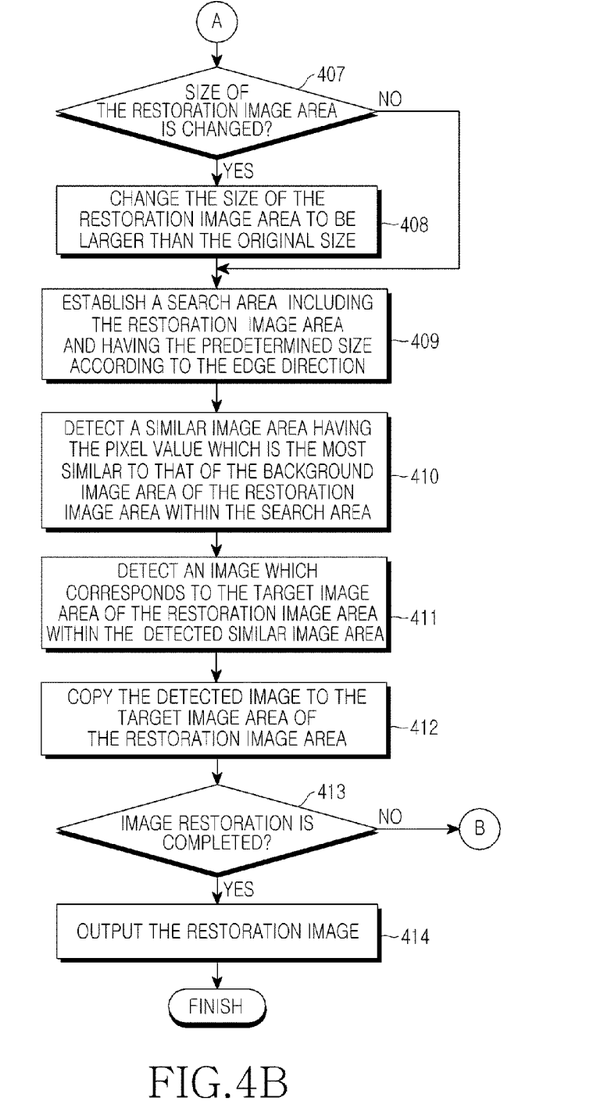
FIG. 4B is a flow chart illustrating the processes for restoring the image by establishing a searched image using the image restoring apparatus in accordance with an embodiment of the present invention.

FIG. 4B is a flow chart illustrating the processes for restoring the image by establishing a searched image using the image restoring apparatus in accordance with a preferred embodiment of the present invention.

The search area setting part 320, establishes a search area in order to locate the similar image area which is the most similar to the restoration image area with reference to the calculated edge direction.

Figure 7A:
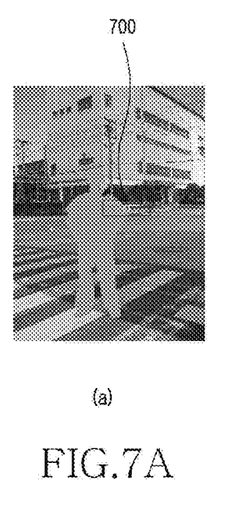
FIGS. 7A through 7C are drawings illustrating a searched area established by the image dividing device in accordance with an embodiment of the present invention.
Figure 7B:
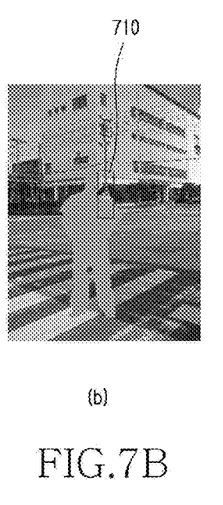
Figure 7C:
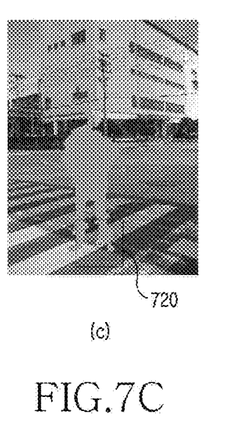

Referring now to FIG. 7, the search area setting part 320 adjusts the transverse and longitudinal lengths of the search area depending on whether the edge direction calculated in the restoration image area setting part 310 around the restoration image area is in a transverse or longitudinal direction. If the operation has proceeded from step 404 to step 407 in FIG. 4A, the restoration image area setting part 310 omits the process for calculating the edge direction of the restoration image area, so the search area setting part 320 calculates the edge direction of the search area in step 409 and then adjusts the transverse and longitudinal lengths of the search area using the calculated edge direction thereof.

For instance, if the edge direction calculated in the restoration image area setting part 310 is a transverse one, the search area setting part 320 may establish a rectangular-shaped search area 700 in FIG. 7A having the transverse length greater than the longitudinal. In contrast, if the edge direction calculated in the restoration image area setting part 310 is a longitudinal one, the search area setting part 320 may establish a rectangular-shaped search area 710 in FIG. 7B having the longitudinal length greater than the transverse. Further, if there is no edge direction calculated in the restoration image area setting part 310, the search area setting part 320 may establish a square-shaped search area 720 in FIG. 7C having the same transverse and longitudinal lengths. Such a search area is established near the restoration image area so as to search for the similar image to the restoration image area.

In order to establish such a search area, the search area setting part 320 employs an algorithm as shown in Table 3.

TABLE 3

```
grad_T_x = total_grad_y
grad_T_y = total_grad_x
if ( grad_T_y >= grad_T_x ) then
    gradient = grad_T_y / grad_T_x
    Search_x_size = INIT_SIZE / gradient
    Search_y_size = INIT_SIZE
    if ( Search_x_size <= Th1 ) then
        Search_x_size = Th1
    end if
else
    gradient = grad_T_x / grad_T_y
    Search_x_size = INIT_SIZE
    Search_y_size = INIT_SIZE / gradient
    if ( Search_y_size <= Th2 ) then
        Search_y_size = Th2
    end if
end if
```

In step 410, the similar image area detecting part 330 detects a similar image area having the pixel value which is the most similar to that of the background image area of the restoration image area within the search area. In other words, as described above the image area detecting part 330 calculates the pixel value for the restoration image area within the search area, i.e., every area corresponding to the background image area within the restoration image area. Then, the similar image area detecting part 330 selects an area, which has the least deviation from the pixel value of the background image area among the calculated pixel values, as a similar image area.

In step 411, the reconstructing part 340 copies the similar target image which corresponds to the target image area of the restoration image area within the similar image area detected from the similar image area detecting part 33.

Figure 5E:
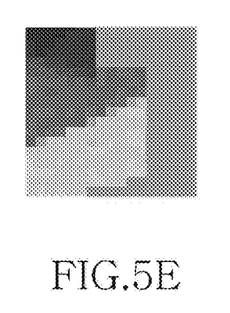

Further, in step 412, the reconstructing part 340 attaches the copied similar target image to the target image area of the restoration image area. The image attached with the similar target image may be illustrated as shown in FIG. 5E.

In step 413, the reconstructing part 340 confirms whether the image restoration operation is completed. If the image restoration operation is complete, step 415 follows, otherwise the process proceeds to back to FIG. 4A steps 402. In the present invention, steps 402 through 415 continue to perform until the image restoration operation is completed by attaching the entire similar target image to the target image.

When the image restoration operation is completed, the reconstructing part 340 transmits the completed restoration image to the final image outputting part 350. In step 414, the final image outputting part 350 displays the final image whose image restoration operation is completed on the screen, and then finish the operation.

Figure 8A:
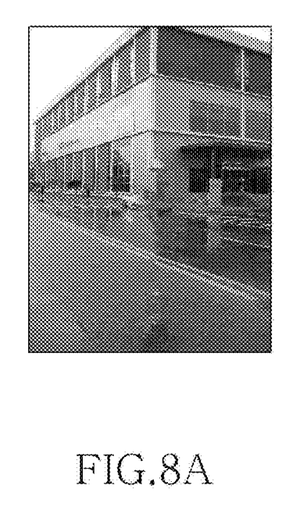
FIGS. 8A and 8B are drawings illustrating both a final image of the prior art and a final image in accordance with an embodiment of the present invention.
Figure 8B:
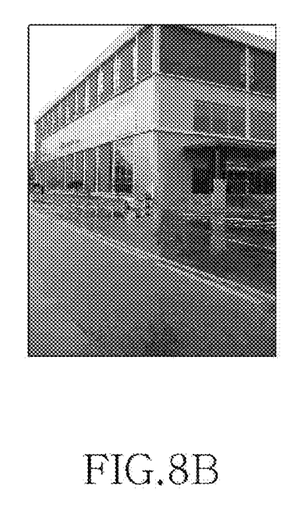

In the prior art, an image including errors as shown in FIG. 8A is outputted, but with the image restoring method as described in the present invention, a natural image having less errors as shown in FIG. 8B is outputted.

With the present invention as described above, it has advantages in that the errors occurring during the image restoration operation can be reduced by changing the position or size of the restoration image area according to the edge direction, so that it may increase the pixel number included in the background image area within the restoration image area which is used to search for the similar image area within the search area, which makes it possible to more exactly detect the most similar image area to the restoration image area.

Further, it can be appreciated that the present invention has advantages in that the user can obtain the final image he/she desires in a much shorter period of time by changing the position or size of the search area to detect the similar image area using the edge direction of the restoration image area, so that the probability to detect the most similar image area to the restoration image area may be increased.

In addition, it can be noted that the present invention has advantages in that it can obtain more natural final image by increasing the probability to detect the most similar image area to the restoration image area, and smoothly perform the image restoration operation even under the circumstance of using a small resource like a wireless communication circumstance.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An image restoring apparatus, comprising:
    a restoration image area setting part for establishing a portion of a target image area to be restored as a restoration image area to be restored with priority according to a request for an image restoration;
    a search area setting part for establishing as a search area an area with a predetermined size including the restoration image area;
    a similar image area detecting part for detecting an image area most similar to the restoration image area in the search area; and
    a reconstructing part for copying the image of the detected similar image area and attaching the same to the restoration image area.

2. The apparatus as recited in claim 1, wherein the restoration image area setting part establishes an area, which has the largest edge value within a background image area adjacent to the boundary of a target image area, as a restoration image area, and wherein the restoration image area setting part changes at least one of the position and size of the established restoration image area according to a result in which a pixel number of the adjacent image area is compared with that of the target image area.

3. The apparatus as recited in claim 2, wherein the restoration image area setting part changes one of a position or a size of the established restoration image area so that the pixel number of the adjacent image area is greater than that of the target image area, when the pixel number of the target image area is less than that of the adjacent image area.

4. The apparatus as recited in claim 1, wherein the search area setting part calculates an edge direction of the restoration image area, and adjusts one of a transverse length or a longitudinal length of the search area with reference to the calculated edge direction.

5. The apparatus as recited in claim 1, wherein the similar image area detecting part detects a similar image area which has a pixel value most similar to a pixel value of the restoration image area within the search area.

6. The apparatus as recited in claim 5, wherein the similar image area detecting part calculates the pixel value for every area corresponding to the adjacent image area within the search area, and selects an area, which has the least deviation from the pixel value of the adjacent image area among the calculated pixel values, as the similar image area.

7. The apparatus as recited in claim 1, wherein the reconstructing part copies a similar target image which corresponds to the target image area of the restoration image area within the detected similar image area, and attaches the similar target image to the target image area.

8. The apparatus as recited in claim 1, further comprising a final image outputting part for outputting a final image when the image restoration operation is completed.

9. An image restoring method, comprising the steps of:
a) establishing a portion of a target image area to be restored as a restoration image area to be restored with priority according to a request for an image restoration;
b) establishing as the search area an area with a predetermined size including the restoration image area;
c) searching for a most similar image area to the restoration image area in the search area; and
d) copying the image of the detected similar image area and attach the same to the restoration image area.

10. The method as recited in claim 9, wherein step a) includes:
establishing as a restoration image area an area, which has the greatest edge value within a background image adjacent to the boundary of a target image area; and
changing at least one of a position and a size of the established restoration image area according to a comparison result in which a pixel number of the adjacent image area is compared with that of a pixel number of the target image area within the established restoration image area.

11. The method as recited in claim 10, wherein the changing step changes the position or size of the established restoration image area so that the pixel number of the adjacent image area is greater than that of the target image area, when the pixel number of the adjacent image area is less than that of the target image area.

12. The method as recited in claim 9, wherein step b) includes:
calculating an edge direction of the restoration image area; and
adjusting one of a transverse length or a longitudinal length of the search area with reference to the calculated edge direction.

13. The method as recited in claim 9, wherein step c) detects the similar image area which a pixel value most similar to a pixel value of the restoration image area in the search area.

14. The method as recited in claim 12, wherein step c) includes:
calculating a pixel value for every area corresponding to the adjacent image area within the search area; and
selecting as the similar image area an area, which has the least deviation from the pixel value of the adjacent image area among the calculated pixel values.

15. The method as recited in claim 9, wherein step d) includes:
copying a similar target image which corresponds to the target image area of the restoration image area within the detected similar image area; and
attaching the copied similar target image to the target image area.

16. The method as recited in claim 9, further comprising outputting a final image to output the final image when the image restoration operation is completed.

* * * * *